(12) United States Patent
Guo et al.

(10) Patent No.: US 10,082,620 B2
(45) Date of Patent: Sep. 25, 2018

(54) BACKLIGHT MODULE AND DISPLAY SCREEN

(71) Applicant: Wuhan China Star Optoelectronics Technology Co., Ltd., Wuhan, Hubei (CN)

(72) Inventors: Qing Guo, Guangdong (CN); Chen Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/143,567

(22) Filed: Apr. 30, 2016

(65) Prior Publication Data

US 2017/0219766 A1 Aug. 3, 2017

(30) Foreign Application Priority Data

Jan. 28, 2016 (CN) .......................... 2016 1 0059322

(51) Int. Cl.
*F21V 7/04* (2006.01)
*F21V 8/00* (2006.01)
*G02F 1/1333* (2006.01)
*G02F 1/1335* (2006.01)

(52) U.S. Cl.
CPC .......... *G02B 6/0088* (2013.01); *G02B 6/005* (2013.01); *G02B 6/009* (2013.01); *G02B 6/0055* (2013.01); *G02B 6/0085* (2013.01); *G02F 1/133308* (2013.01); *G02F 2001/133314* (2013.01); *G02F 2001/133628* (2013.01)

(58) Field of Classification Search
CPC .. G02B 6/0066; G02B 6/0068; G02B 6/0073; G02B 6/0085–6/0091
See application file for complete search history.

(56) References Cited

U.S. PATENT DOCUMENTS

| 9,594,208 B2 * | 3/2017 | Zhou ...................... G02B 6/005 |
| 2015/0219835 A1 * | 8/2015 | Kim ..................... G02B 6/0086 362/609 |
| 2016/0054507 A1 * | 2/2016 | Hirayama ............ G02B 6/0053 349/65 |

FOREIGN PATENT DOCUMENTS

| CN | 101338867 A | 1/2009 |
| CN | 203757522 U | 8/2014 |
| CN | 104566023 A | 4/2015 |

* cited by examiner

*Primary Examiner* — Sean Gramling
(74) *Attorney, Agent, or Firm* — Andrew C. Cheng

(57) ABSTRACT

A backlight module includes a mold frame, a light guide board, an optic film, a light source, and a heat dissipative sheet. The light guide board has a light incident surface and a light exit surface that is arranged adjacent to the light incident surface. The light source is arranged opposite to the light incident surface of the light guide board. The optic film is attached to the light exit surface. The light source and the light guide board are mounted inside the mold frame. The light source is fixed by a double-sided adhesive tape to the mold frame. The heat dissipative sheet is attached to a surface of the double-sided adhesive tape that is opposite to the mold frame and a projection of the light source is cast to the heat dissipative sheet. A liquid crystal panel and a display screen are also provided.

9 Claims, 2 Drawing Sheets

BACKLIGHT MODULE AND DISPLAY SCREEN

BACKGROUND OF THE INVENTION

1. Field of the Invention

The present invention relates to the field of liquid crystal display technology, and more particularly to a backlight module and a display screen.

2. The Related Arts

Liquid crystal display devices, serving as display devices of electronic equipment, have been widely used in various electronic products. Following the development trend of electronic products toward being thinner and lighter, bezels of the electronic equipment are made slimmer and slimmer. A backlight module is an important component of a liquid crystal display device. Today's mobile phone screens have increasingly higher resolutions and correspondingly, necessary backlighting illumination is increased. Consequently, the heat incurring with the backlighting is also increased. To prevent negative influence on displaying by the accumulation of heat, a heat dissipation structure must be added in the backlight module. A common solution is to attach a layer of heat dissipation film to a back side of the backlighting, namely a back side of a reflective sheet, in order to absorb the heat generated by LEDs and thus lowering down temperature. An advantage of such a solution is the operation being easy; however, a drawback is that the overall thickness of the module is increased. Further, air gap may be present between the reflective sheet and the LEDs and efficiency of dissipating heat is poor.

SUMMARY OF THE INVENTION

The technical issue to be addressed by the present invention is to provide a backlight module, which does not increase the overall thickness and provides bettered heat dissipation.

The present invention also provides a display panel and a display screen.

To achieve the above objects, the present invention provides the following technical solution:

The present invention relates to a backlight module. The backlight module comprises a mold frame, a light guide board, an optic film, a light source, and a heat dissipative sheet. The light guide board comprises a light incident surface and a light exit surface that is arranged adjacent to the light incident surface. The light source is arranged opposite to the light incident surface of the light guide board. The optic film is attached to the light exit surface. The light source and the light guide board re mounted inside the mold frame. The light source is fixed by a double-sided adhesive tape to the mold frame. The heat dissipative sheet is attached to a surface of the double-sided adhesive tape that is opposite to the mold frame in such a way that a projection of the light source is cast to the heat dissipative sheet.

In the above backlight module, the heat dissipative sheet further comprises an extension section. The extension section is formed by extending an end of the heat dissipative sheet that is located at an edge of the mold frame in a direction away from the mold frame.

In the above backlight module, the backlight module further comprises a reflector sheet. The reflector sheet is arranged at one side of the light guide board that is opposite to the light exit surface.

In the above backlight module, the heat dissipative sheet comprises two heat dissipative layers.

The present invention also relates to a display panel. The display panel comprises a display body and a backlight module. The backlight module comprises a mold frame, a light guide board, an optic film, a light source, and a heat dissipative sheet. The light guide board comprises a light incident surface and a light exit surface that is arranged adjacent to the light incident surface. The light source is arranged opposite to the light incident surface of the light guide board. The optic film is attached to the light exit surface. The light source and the light guide board re mounted inside the mold frame. The light source is fixed by a double-sided adhesive tape to the mold frame. The heat dissipative sheet is attached to a surface of the double-sided adhesive tape that is opposite to the mold frame in such a way that a projection of the light source is cast to the heat dissipative sheet. The display body has a displaying surface to which a lower polarization layer is attached. The display panel is attached to the backlight module with the lower polarization layer attached to the optic film and the heat dissipative sheet located between the display body and the double-sided adhesive tape to be on the same level as the lower polarization layer.

In the above display panel, the heat dissipative sheet further comprises an extension section. The extension section being formed by extending an end of the heat dissipative sheet that is located at an edge of the mold frame in a direction away from the mold frame.

In the above display panel, the heat dissipative sheet comprises two heat dissipative layers.

The present invention further relates to a display screen. The liquid crystal display screen comprises a casing and a display panel. The display panel comprises a display body and a backlight module. The backlight module comprises a mold frame, a light guide board, an optic film, a light source, and a heat dissipative sheet. The light guide board comprises a light incident surface and a light exit surface that is arranged adjacent to the light incident surface. The light source is arranged opposite to the light incident surface of the light guide board. The optic film is attached to the light exit surface. The light source and the light guide board re mounted inside the mold frame. The light source is fixed by a double-sided adhesive tape to the mold frame. The heat dissipative sheet is attached to a surface of the double-sided adhesive tape that is opposite to the mold frame in such a way that a projection of the light source is cast to the heat dissipative sheet. The display body has a displaying surface to which a lower polarization layer is attached. The display panel is attached to the backlight module with the lower polarization layer attached to the optic film and the heat dissipative sheet located between the display body and the double-sided adhesive tape to be on the same level as the lower polarization layer. The display panel is mounted to the casing.

In the above display screen, the heat dissipative sheet further comprises an extension section. The extension section is formed by extending an end of the heat dissipative sheet that is located at an edge of the mold frame in a direction away from the mold frame. The casing comprises a sidewall, and the extension section is bent and attached to an inside surface of the sidewall.

The present invention provides a liquid crystal panel that has a backlight module having a heat dissipation sheet that is directly arranged on a light source without an obstacle therebetween so as to directly dissipate heat from the light source thereby improving heat dissipation efficiency.

BRIEF DESCRIPTION OF THE DRAWINGS

To more clearly explain the technical solution proposed in the present invention, a brief description of the drawings that are necessary for embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of an embodiment of the present invention with reference to the attached drawings of the embodiment of the present invention.

A preferred embodiment of the present invention provides a backlight module and a display panel that are generally applicable to a display screen. The display panel can be a liquid crystal display panel and is mountable on the backlight module. The liquid crystal panel and the backlight module are fixed to each other by means of double-sided adhesive tapes. The backlight module provides the display screen with sufficient illumination and uniformly distributed light emission elements in order to enable normal displaying of images.

Figure 1:
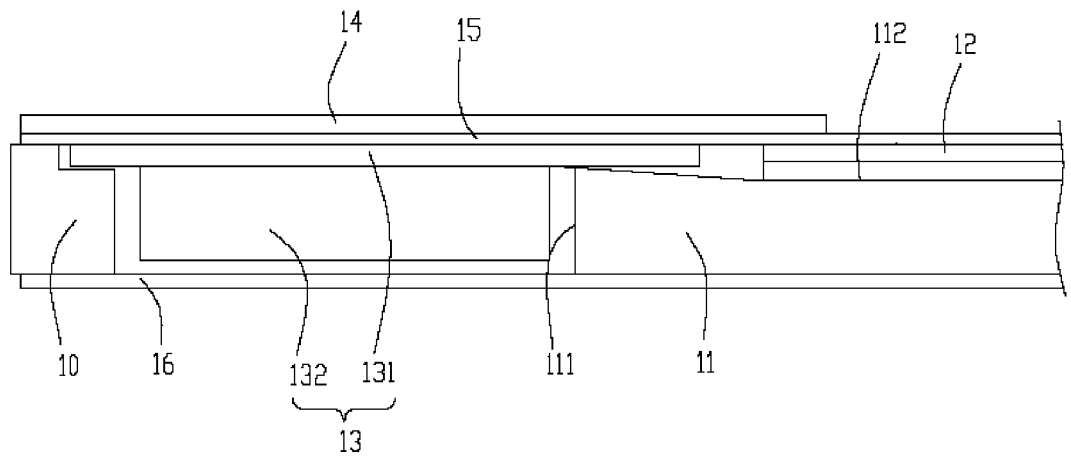
FIG. 1 is a schematic view illustrating a backlight module according to a preferred embodiment of the present invention.
Figure 3:
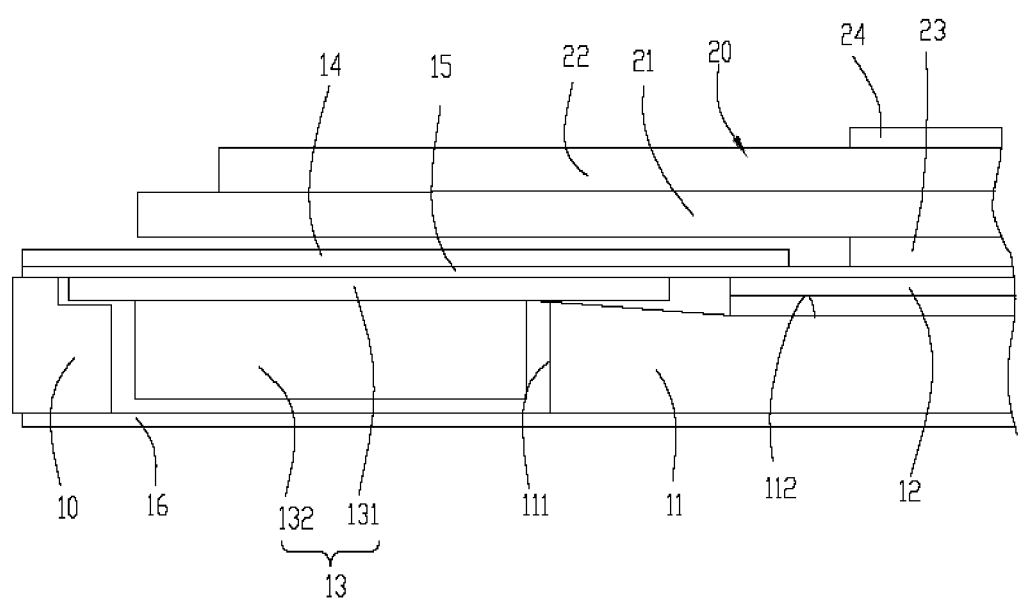
FIG. 3 is a schematic view illustrating a display pane according to the present invention.

Referring to FIGS. 1 and 3, a backlight module of the instant embodiment comprises a mold frame 10, a light guide board 11, an optic film 12, a light source 13, and a heat dissipative sheet 14. The light guide board 11 comprises a light incident surface 111 and a light exit surface 112 that is arranged adjacent to the light incident surface 111. The light source 13 is arranged opposite to the light incident surface 111 of the light guide board 11; and the optic film 12 is attached to the light exit surface 112. The light source 13 and the light guide board 11 are mounted inside the mold frame 10. The light source 13 is fixed by a double-sided adhesive tape 15 to the mold frame 10. The heat dissipative sheet 14 is attached to a surface of the double-sided adhesive tape 15 that is opposite to the mold frame 10 in such a way that a projection of the light source 13 is cast to the heat dissipative sheet 14.

In the instant embodiment, the mold frame 10 is a rectangular frame circumferentially delimiting and defining a receiving space. The light source 13 and the light guide board 11 are received in the receiving space. The backlight module also comprises a reflector sheet 16 and the sheet 16 is attached to the mold frame and arranged at one side of the light guide board that is opposite to the light exit surface to serve as a bottom board of the backlight module. The light source 13 comprises a substrate 131 and a light-emitting diode (LED) light 132. The substrate 131 has a surface that is opposite to the LED and is fixed by the double-sided adhesive tape 15 to the mold frame 10 and the light guide board 11. The heat dissipative sheet 14 is made of a thermally conductive material and can be of a single-layered structure or a dual-layered structure according to the amount of heat from the light source 13. The heat dissipative sheet 14 is attached to the double-sided adhesive tape at a location corresponding to the light source so that no additional adhesive may be needed on the reflector sheet and, compared to being fixed outside the reflector sheet, can reduce the thickness of the backlight module. In addition, the heat dissipative sheet is directly arranged on the light source 13 and is not separated therefrom by a reflector sheet so that direct dissipation of heat may be achieved to thereby improve the efficiency of heat dissipation.

Figure 2:
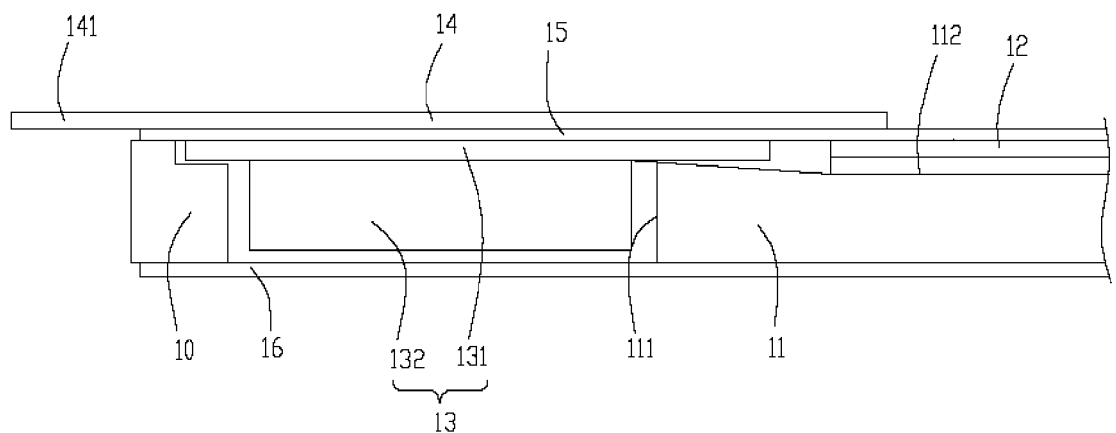
FIG. 2 is a schematic view illustrating a structure of the backlight module of FIG. 1 in which a heat dissipative sheet is provided with an extension section.

Referring to FIG. 2, the heat dissipative sheet 14 also comprises an extension section 141. The extension section 141 is formed by extending an end of the heat dissipative sheet 14 that is located at an edge of the mold frame in a direction away from the mold frame 10. The extension section 141 is arbitrarily bendable or flexible.

Referring to FIG. 3, a display panel of the present invention comprises a display body 20. In the instant embodiment, the display body comprises an array substrate 21, a color filter substrate 22, and a liquid crystal layer interposed between the array substrate and the color filter substrate. The display body has a displaying surface to which a lower polarization layer 23 and an upper polarization layer 24 are attached, meaning an outer surface of the array substrate 21 receives the lower polarization layer to attach thereon. The display panel is attached by means of optical cement to the backlight module with the lower polarization layer 23 attached to the optic film 12 and the heat dissipative sheet 14 located between the display body 20 and the double-sided adhesive tape 15 to be on the same level as the lower polarization layer 23. The heat dissipative sheet 14 has a lateral side that is jointable to a lateral side of the lower polarization layer 23 and the heat dissipative sheet 14 has a thickness that is smaller than a thickness of the lower polarization sheet 23. In the display panel of the present invention, the backlighting heat dissipative sheet 14 and the polarization layer are locate don the same level so as to help reduce the overall thickness of the display panel.

A display screen of the present invention comprises a casing and the display panel. The display panel is mounted to the casing. The casing comprises a sidewall and the extension section is bent and attached to an inside surface of the sidewall. The heat dissipative sheet 14 allows heat transferred from the light source 13 to transmit through the extension section 141 to the casing for dissipating the heat such that the performance of heat dissipation of the backlight module is greatly improved thereby ensuring reliability of the display panel for displaying.

The present invention has been described with reference to the preferred embodiments. However, it is noted that those skilled in the art would appreciates that various improvements and modifications are still available without departing from the scope of the present invention and such improvements and modifications are considered within the scope of protection of the present invention.

What is claimed is:

1. A backlight module, comprising a mold frame, a light guide board, an optic film, a light source comprising a substrate and a light emission element, and a heat dissipative sheet, the light guide board comprising a light incident surface and a light exit surface that is arranged adjacent to the light incident surface, the light emission element of the light source being arranged opposite to the light incident surface of the light guide board, the optic film being attached to the light exit surface, the light source and the light guide board being mounted inside the mold frame, the light source being fixed by a double-sided adhesive tape to the mold frame with the substrate of the light source being attached to an first surface of the double-sided adhesive tape, the heat dissipative sheet being attached to an opposite, second surface of the double-sided adhesive tape that is opposite to the mold frame;

wherein the double-sided adhesive tape is located above the mold frame and the optic film that is attached to the light exit surface of the light guide board and extends over the mold frame and the optic film that is attached to the light exit surface of the light guide board; and opposite end portions of the opposite, second surface of the double-sided adhesive tape are respectively mounted to and supported on the mold frame and the optic film that is attached to the light exit surface of the light guide board so as to support the light emission element of the light source between the light incident surface of the light guide board and the mold frame, and wherein the heat dissipative sheet is attached to the opposite, second surface of the double-sided adhesive tape and is opposite to the light source and is exposed on the surface of double-sided adhesive tape and outside the mold frame, the surface of the heat dissipative sheet having a surface area that covers the light source so that an orthogonal geometric projection of the light source falls within the surface area of the heat dissipative sheet; and wherein the heat dissipative sheet is attached to the opposite, second surface of the double-sided adhesive tape and is mounted to the mold frame and the optic film by the double-sided adhesive tape.

2. The backlight module as claimed in claim 1, wherein the heat dissipative sheet further comprises an extension section, the extension section being formed by extending an end of the heat dissipative sheet that is located at an edge of the mold frame in a direction away from the mold frame.

3. The backlight module as claimed in claim 2, wherein the backlight module further comprises a reflector sheet, the reflector sheet being arranged at one side of the light guide board that is opposite to the light exit surface.

4. The backlight module as claimed in claim 1, wherein the heat dissipative sheet comprises two heat dissipative layers.

5. A display panel, comprising a display body and a backlight module, the backlight module comprising a mold frame, a light guide board, an optic film, a light source comprising a substrate and a light emission element, and a heat dissipative sheet, the light guide board comprising a light incident surface and a light exit surface that is arranged adjacent to the light incident surface, the light emission element of the light source being arranged opposite to the light incident surface of the light guide board, the optic film being attached to the light exit surface, the light source and the light guide board being mounted inside the mold frame, the light source being fixed by a double-sided adhesive tape to the mold frame with the substrate of the light source being attached to an first surface of the double-sided adhesive tape, the heat dissipative sheet being attached to an opposite, second surface surface of the double-sided adhesive tape that is opposite to the mold frame, the display body having a displaying surface to which a lower polarization layer is attached, the display panel being attached to the backlight module with the lower polarization layer attached to the optic film and the heat dissipative sheet located between the display body and the double-sided adhesive tape to be on the same level as the lower polarization layer;

wherein the double-sided adhesive tape is located above the mold frame and the optic film that is attached to the light exit surface of the light guide board and extends over the mold frame and the optic film that is attached to the light exit surface of the light guide board; and opposite end portions of the opposite, second surface of the double-sided adhesive tape are respectively mounted to and supported on the mold frame and the optic film that is attached to the light exit surface of the light guide board so as to support the light emission element of the light source between the light incident surface of the light guide board and the mold frame, and wherein the heat dissipative sheet is attached to the opposite, second surface of the double-sided adhesive tape and is opposite to the light source and is exposed on the surface of double-sided adhesive tape and outside the mold frame, the surface of the heat dissipative sheet having a surface area that covers the light source so that an orthogonal geometric projection of the light source falls within the surface area of the heat dissipative sheet; and wherein the heat dissipative sheet is attached to the opposite, second surface of the double-sided adhesive tape and is mounted to the mold frame and the optic film by the double-sided adhesive tape.

6. The display panel as claimed in claim 5, wherein the heat dissipative sheet further comprises an extension section, the extension section being formed by extending an end of the heat dissipative sheet that is located at an edge of the mold frame in a direction away from the mold frame.

7. The display panel as claimed in claim 5, wherein the heat dissipative sheet comprises two heat dissipative layers.

8. A display screen, comprising a casing and a display panel, the display panel comprises a display body and a backlight module, the backlight module comprising a mold frame, a light guide board, an optic film, a light source comprising a substrate and a light emission element, and a heat dissipative sheet, the light guide board comprising a light incident surface and a light exit surface that is arranged adjacent to the light incident surface, the light emission element of the light source being arranged opposite to the light incident surface of the light guide board, the optic film being attached to the light exit surface, the light source and the light guide board being mounted inside the mold frame, the light source being fixed by a double-sided adhesive tape to the mold frame with the substrate of the light source being attached to an first surface of the double-sided adhesive tape, the heat dissipative sheet being attached to an opposite, second surface of the double-sided adhesive tape that is opposite to the mold frame, the display body having a displaying surface to which a lower polarization layer is attached, the display panel being attached to the backlight module with the lower polarization layer attached to the optic film and the heat dissipative sheet located between the display body and the double-sided adhesive tape to be on the same level as the lower polarization layer, the display panel being mounted to the casing;

wherein the double-sided adhesive tape is located above the mold frame and the optic film that is attached to the light exit surface of the light guide board and extends over the mold frame and the optic film that is attached to the light exit surface of the light guide board; and opposite end portions of the opposite, second surface of the double-sided adhesive tape are respectively mounted to and supported on the mold frame and the optic film that is attached to the light exit surface of the light guide board so as to support the light emission element of the light source between the light incident surface of the light guide board and the mold frame, and wherein the heat dissipative sheet is attached to the opposite, second surface of the double-sided adhesive tape and is opposite to the light source and is exposed on the surface of double-sided adhesive tape and outside the mold frame, the surface of the heat dissipative sheet having a surface area that covers the light source so that an orthogonal geometric projection of the light source falls within the surface area of the heat dissipative sheet; and wherein the heat dissipative sheet is attached to the opposite, second surface of the double-sided adhesive tape and is mounted to the mold frame and the optic film by the double-sided adhesive tape.

9. The display screen as claimed in claim 8, wherein the heat dissipative sheet further comprises an extension section, the extension section being formed by extending an end of the heat dissipative sheet that is located at an edge of the mold frame in a direction away from the mold frame, the casing comprising a sidewall, the extension section being bent and attached to an inside surface of the sidewall.

\* \* \* \* \*